United States Patent
Bang et al.

(10) Patent No.: US 10,065,796 B2
(45) Date of Patent: Sep. 4, 2018

(54) BARRIER STRUCTURE AND BARRIER SHEET FOR LIQUEFIED NATURAL GAS CARGO TANK

(75) Inventors: Changseon Bang, Geoje-si (KR); Jihan Kim, Geoje-si (KR); Jong Gyu Lee, Geoje-si (KR)

(73) Assignee: Samsung Heavy Ind. Co., Ltd. (KR)

( * ) Notice: Subject to any disclaimer, the term of this patent is extended or adjusted under 35 U.S.C. 154(b) by 1071 days.

(21) Appl. No.: 13/807,641

(22) PCT Filed: Mar. 15, 2011

(86) PCT No.: PCT/KR2011/001788
§ 371 (c)(1),
(2), (4) Date: Dec. 28, 2012

(87) PCT Pub. No.: WO2012/011649
PCT Pub. Date: Jan. 26, 2012

(65) Prior Publication Data
US 2013/0098931 A1     Apr. 25, 2013

(30) Foreign Application Priority Data
Jul. 23, 2010   (KR) .................. 10-2010-0071436

(51) Int. Cl.
*B65D 90/08*   (2006.01)
*B32B 15/14*   (2006.01)
(Continued)

(52) U.S. Cl.
CPC .............. *B65D 90/08* (2013.01); *B32B 15/14* (2013.01); *B32B 17/061* (2013.01); *B63B 3/68* (2013.01);
(Continued)

(58) Field of Classification Search
CPC ... B32B 15/14; B32B 17/061; B32B 2250/03; B65D 90/06; F17C 2203/0643;
(Continued)

(56) References Cited

U.S. PATENT DOCUMENTS 3,969,177 A * 7/1976 Doran et al. .................. 156/288
4,055,268 A   10/1977 Barthel
(Continued)

FOREIGN PATENT DOCUMENTS

| KR | 2005-0089075 | 9/2005 |
| KR | 10-0855126   | 8/2008 |

(Continued)

OTHER PUBLICATIONS

The extended European Search Report dated Jul. 15, 2015 issued in corresponding European Patent Application No. 11809776.5 (10 pages).

*Primary Examiner* — Jennifer A Steele
(74) *Attorney, Agent, or Firm* — Harness, Dickey & Pierce, P.L.C.

(57) ABSTRACT

A barrier sheet for an LNG cargo tank includes a first barrier sheet so as to form a secondary barrier of the cargo tank and a second barrier sheet attached on the first barrier sheet. Each of the first and second sheets includes first and second metal layers and a glass cloth layer interposed between the first and second layers and bonded to the first and second metal layers.

6 Claims, 3 Drawing Sheets

US 10,065,796 B2
Page 2

(51) Int. Cl.
*B65D 90/06* (2006.01)
*F17C 3/02* (2006.01)
*F17C 13/00* (2006.01)
*B63B 3/68* (2006.01)
*B63B 25/16* (2006.01)
*B32B 17/06* (2006.01)

(52) U.S. Cl.
CPC .............. *B63B 25/16* (2013.01); *B65D 90/06* (2013.01); *F17C 3/027* (2013.01); *F17C 13/001* (2013.01); *B32B 2250/03* (2013.01); *F17C 2201/0157* (2013.01); *F17C 2201/052* (2013.01); *F17C 2203/0358* (2013.01); *F17C 2203/0602* (2013.01); *F17C 2203/0631* (2013.01); *F17C 2203/0636* (2013.01); *F17C 2203/0643* (2013.01); *F17C 2203/0646* (2013.01); *F17C 2203/0663* (2013.01); *F17C 2221/033* (2013.01); *F17C 2223/0161* (2013.01); *F17C 2223/033* (2013.01); *F17C 2260/036* (2013.01); *F17C 2270/0105* (2013.01); *F17C 2270/0107* (2013.01)

(58) Field of Classification Search
CPC ...... F17C 2203/0646; F17C 2203/0663; F17C 2203/00631; F17C 2203/03; F17C 3/027
USPC ........ 220/560.04–560.15; 428/457; 442/6–8, 442/23, 27, 29, 31, 38, 228, 232–237, 442/378, 355
See application file for complete search history.

(56) References Cited

U.S. PATENT DOCUMENTS

| | | | |
|---|---|---|---|
| 4,073,998 A | | 2/1978 | O'Connor |
| 4,378,403 A | * | 3/1983 | Kotcharian ................. 442/234 |
| 4,403,010 A | | 9/1983 | Festag et al. |
| 4,513,550 A | * | 4/1985 | Kotcharian ............. F17C 3/022 220/560.03 |
| 4,514,450 A | | 4/1985 | Nowobilski et al. |
| 4,996,095 A | | 2/1991 | Behdorf et al. |
| 6,953,512 B2 | | 10/2005 | Cohen et al. |
| 7,446,064 B2 | * | 11/2008 | Hanks et al. ................. 442/378 |
| 2002/0023926 A1 | * | 2/2002 | Dhellemmes ................. 220/586 |
| 2011/0056955 A1 | * | 3/2011 | Joh et al. ................. 220/560.12 |

FOREIGN PATENT DOCUMENTS

| | | |
|---|---|---|
| KR | 10-2008-0104801 | 12/2008 |
| KR | 10-2008-0106794 | 12/2008 |
| KR | 10-2009-0132534 | 12/2009 |
| KR | 2009-0123129 | 12/2009 |
| WO | 2007-038812 A1 | 4/2007 |
| WO | 2009-154427 A2 | 12/2009 |

\* cited by examiner

BARRIER STRUCTURE AND BARRIER SHEET FOR LIQUEFIED NATURAL GAS CARGO TANK

CROSS-REFERENCE TO RELATED APPLICATIONS

This application is a U.S. National Stage of International Application No. PCT/KR2011/001788, filed on Mar. 15, 2011 and published in Korean as WO 2012/011649 on Jan. 26, 2012. This application claims priority to Korean Application No. 10-2010-0071436, filed on Jul. 23, 2010. The disclosures of the above applications are incorporated herein by reference.

FIELD OF THE INVENTION

The present invention relates to a barrier structure and barrier sheet for a liquefied natural gas (LNG) cargo tank in LNG carriers to carry LNG or floating offshore platforms to produce and store LNG, and more particularly, to a barrier structure for an LNG cargo tank and a barrier sheet used in the barrier structure.

BACKGROUND

In general, LNG refers to a colorless, transparent, and ultra-low temperature liquid obtained by cooling methane-based natural gas at about −163° C. and reducing the volume thereof to 1/600.

LNG carriers to carry LNG or floating offshore platforms to produce and store LNG are provided with a cargo tank capable of containing and storing the LNG at an ultra-low temperature. The LNG cargo tank uses a membrane sheet as a primary barrier and uses a triplex as a secondary barrier. Herein, the triplex for the secondary barrier includes a rigid triplex and a supple triplex. The rigid triplex is previously attached on the surface of an insulation panel during a manufacturing process, and the supple triplex is attached over the rigid triplex through an adhesive such as epoxy glue.

FIG. 1A illustrates a conventional LNG cargo tank 1. Referring to FIG. 1A, the cargo tank 1 of a ship or floating offshore platform includes insulation panels 2 installed on the bottom, ceiling, or walls of the inner surface thereof, wherein the insulation panel 2 is a kind of radiation panel which is previously manufactured.

The insulation panels 2 may include a lower insulation panel 2a, a rigid triplex 5, and an upper insulation panel 2b. The lower insulation panel 2a is attached and fixed to the walls and the like of the cargo tank 1 through epoxy mastic and stud bolts. The rigid triplex is formed over the lower insulation panel 2a. The upper insulation panel 2b is disposed over the rigid triplex 5 and having a smaller horizontal area than the lower insulation panel 2a.

Further, a flat joint 2c formed of glass wool and having pores is inserted between the lower insulation panels 2a adjacent to each other.

Further, between the upper insulation panels 2b is formed a working area 3.

In the working area 3, a supple or flexible triplex 7 is attached to the top surface of the rigid triplex 5 with an adhesive layer 6 interposed therebetween, and a top bridge pad (not illustrated) is installed.

Referring to FIG. 1B, the rigid triplex 5 and the supple triplex 7 of the conventional LNG cargo tank are formed of composite materials in which a first layer A, a second layer C, and an intermediate B are arranged in a sandwich structure or stacked structure. The first and second layers A and C are formed of glass cloth, and the intermediate layer B is formed of aluminum. In this stacked structure, the intermediate layer B serves for liquid tightness and/or air tightness, and the first and second layers A and C serve to reinforce the intermediate layer B. The first and second layers A and C are attached to each other with the intermediate layer B interposed therebetween, and the outer surface of the first or second layer A or C is exposed to the external environment.

The rigid triplex 5 of the conventional LNG cargo tank is strictly managed after the rigid triplex 5 is manufactured to be coupled to the lower insulation panel 2A. Furthermore, the rigid triplex 5 is managed without a flexural deformation even while it is shipped for the use. Therefore, gas and/or liquid L rarely leaks from the rigid triplex 5.

On the other hand, although the supple triplex 7 of the conventional LNG cargo is strictly managed, it is highly likely that gas and/or liquid L leaks from the supply triplex 7, because the supple triplex 7 is rolled in a manufacturing process and unrolled to use in the field.

For example, when the secondary barrier is constructed in the cargo tank using the supple triplex 7, the second layer C of the rigid triplex 5 and the first layer A of the supple triplex 7 are bonded to each other. Under construction, a portion where an interlayer adhesive is not sufficiently impregnated may become weak due to a manufacturing error or careless management of the supple triplex 7 or the method in which the supple triplex 7 is rolled and then unrolled to use. In this case, a leakage path may be formed between the second layer C and the intermediate layer B or the first layer A and the intermediate layer B. Along the leakage path formed in such a manner, gas and/or leakage L may leak. The leakage may cause a problem between the first layer A and the intermediate layer B of the supple triplex 7.

Furthermore, although a crack is formed between the second layer C and the intermediate layer B of the supple triplex 7 due to repeated thermal loads, liquid tightness and/or air tightness is maintained by the intermediate layer B. Therefore, the gas and/or liquid L inside the cargo tank does not leak toward the pores or the outside of the cargo tank.

On the other hand, the crack may form a leakage path P1 between the first layer A and the intermediate layer B of the supple triplex 7, and may form another leakage path P2 extended from the leakage path P1 in the thickness direction of the first layer A. That is, when the viscosity of the interlayer adhesive impregnated in the composite materials forming the supple triplex 7 is high and the supple triplex 7 is subjected to repeated thermal loads, a crack may occur due to a difference in thermal expansion coefficient between glass cloth and resin, thereby forming the above-described leakage paths P1 and P2.

Therefore, when an operation of attaching the supple triplex 7 in a strip or belt shape is performed in the working area 3 described with reference to FIG. 1 so as to construct the secondary barrier of the LNG cargo hole, gas and/or liquid L inside the cargo tank may leak to the outside of the cargo tank through the leakage paths P1 and P2 and the pores of the flat joint 2C. Accordingly, the liquid tightness and/or air tightness required by the secondary barrier may not be achieved.

For example, Korean Patent Laid-Open Publication No. 10-2009-0132534 published on Dec. 30, 2009 and commonly owned application discloses an insulation structure of an LNG carrier cargo tank which improves reliability for repeated thermal loads and has an improved sealing force.

SUMMARY

In view of the above, the present invention provides a barrier structure capable of preventing the formation of a leakage path of gas and/or liquid of an LNG cargo tank.

Further, the present invention provides a barrier sheet used in a barrier structure of an LNG cargo tank.

In accordance with an aspect of the present invention, there is provided a barrier sheet for a liquefied natural gas (LNG) cargo tank, which includes: first and second metal layers stacked to form a secondary barrier of the LNG cargo tank; and a glass cloth layer interposed between the first and second metal layers and bonded to the first and second metal layers.

In accordance with another aspect of the present invention, there is provided a barrier structure for an LNG cargo tank, which includes: an insulation panel fixed to the cargo tank and comprising lower insulation panels adjacent to each other with a flat joint interposed therebetween and an upper insulation panel stacked over the lower insulation panels; a first barrier sheet attached between the upper insulation panel and the lower insulation panel so as to form the secondary barrier of the cargo tank; and a second barrier sheet attached on the first barrier sheet over the flat joint, wherein each of the first and second sheets comprises first and second metal layers and a glass cloth layer interposed between the first and second layers.

Preferably, the first and second metal layers are formed of aluminum and have a thickness of about 0.03 to 0.2 mm.

Preferably, the first and second metal layers are formed of stainless steel and have a thickness of about 0.05 to 0.1 mm.

Preferably, the first and the second barrier sheets are bonded to each other using a liquid adhesive for the secondary barrier or a synthetic resin film having an adhesive applied the surface thereof.

Preferably, the glass cloth layer is formed of prepreg which is fabric reinforced composite materials.

Preferably, the glass cloth layer has a thickness of about 0.15 to 0.4 mm such that the first and the second barrier sheets satisfy a mechanical property for the secondary barrier.

In accordance with the embodiments of the present invention, when the secondary barrier of the LNG cargo tank is constructed, the second metal layer in the first barrier sheet and the first metal layer in the second barrier sheet are bonded to each other. Therefore, although an interlayer bonding defect occurs to form a path through which gas and/or liquid may move, the path is prevented from being used as a leakage path of gas and/or liquid. As a result, it is possible to implement a reliable barrier structure from which gas and/or liquid does not leak.

Further, it is possible to provide the barrier sheet exhibiting a superior mechanical property and a superior sealing characteristic of air tightness and/or liquid tightness to the existing triplex.

Furthermore, the barrier sheet in accordance with the embodiment of the present invention has an optimized thickness range capable of removing the concern of damage during the manufacturing and handling process and securing flexibility. therefore, when the secondary barrier of the cargo tank is constructed, the barrier sheet may be bent to correspond to a level difference between the insulation panels. Accordingly, it is easy to deal with the barrier sheet.

DETAILED DESCRIPTION

Figure 1A:
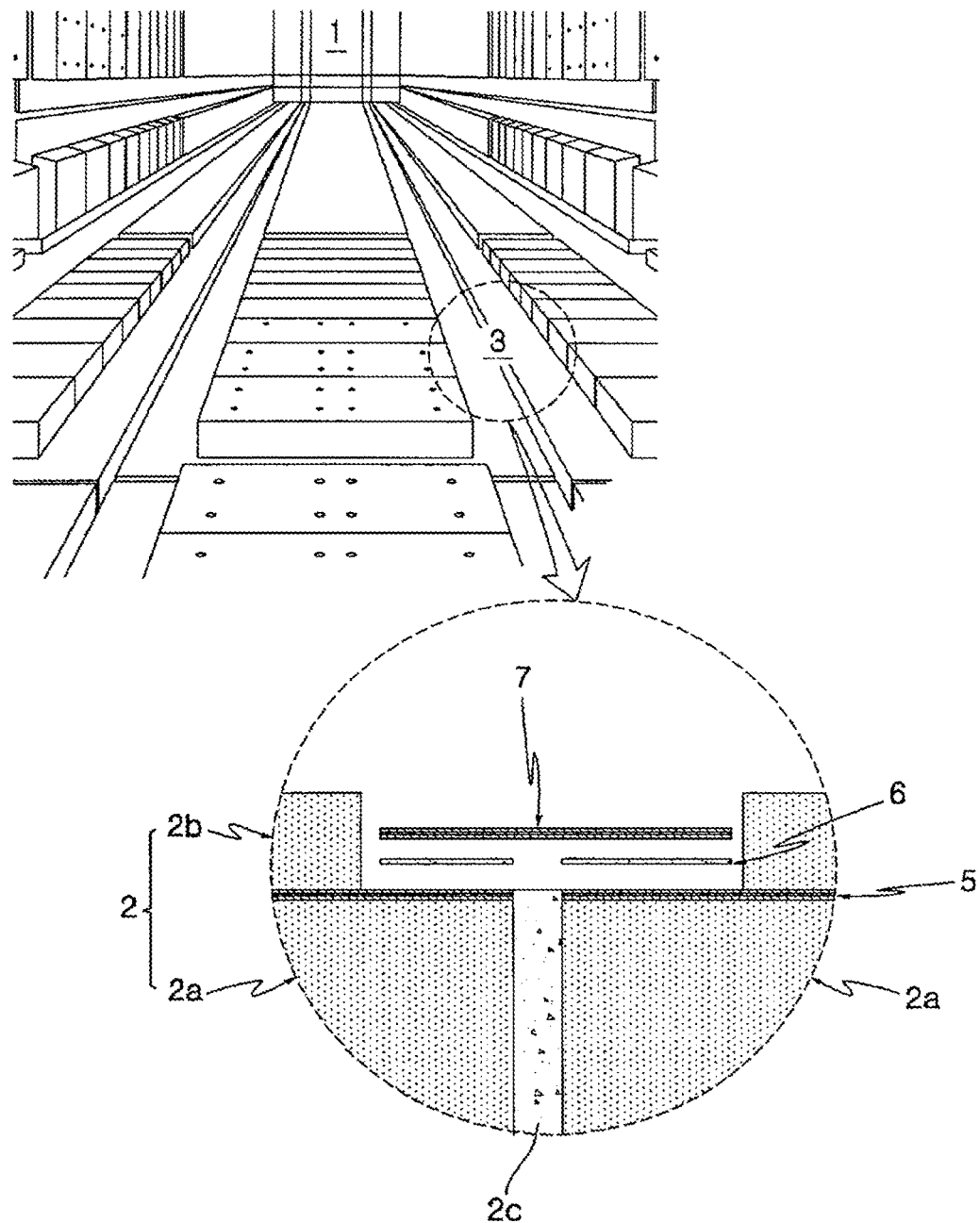
FIG. 1A is a diagram for explaining a barrier structure formed in a conventional LNG cargo tank.
Figure 1B:
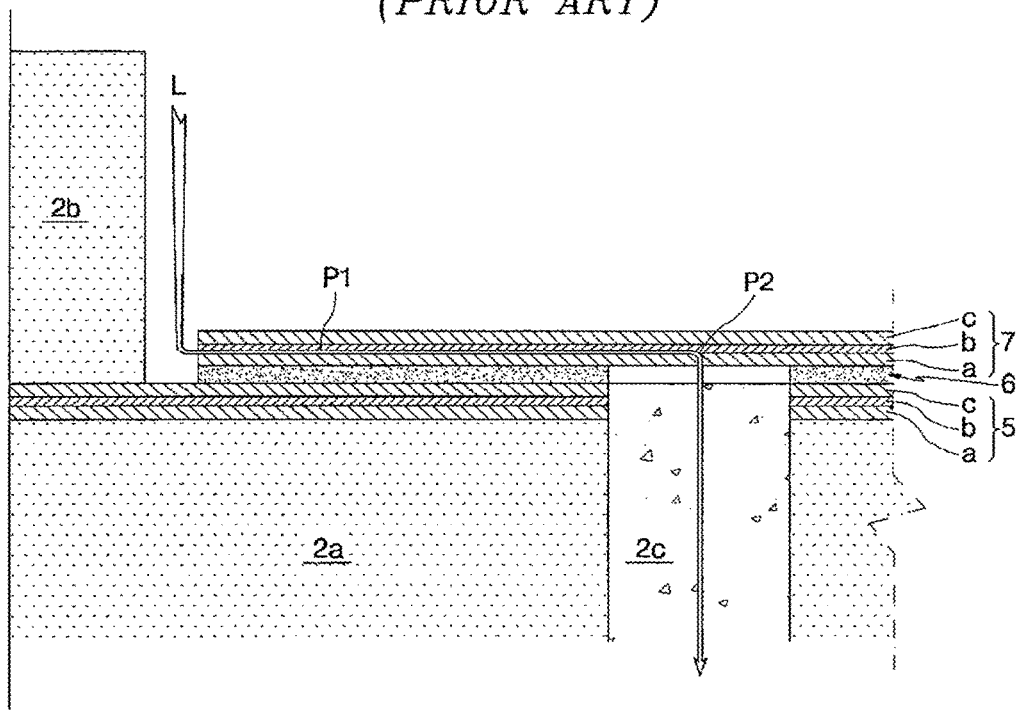
FIG. 1B is a cross-sectional view of triplexes and insulation panels formed in the barrier structure of FIG. 1A.

Hereinafter, a barrier structure and barrier sheet for an LNG cargo tank in accordance with an embodiment of the present invention will be described in detail with reference to FIG. 2 to FIG. 4, in which same or like reference numerals refer to the same components throughout the accompanying drawings.

While the embodiments of the present invention have been described, they are exemplary ones only and do intend not to limit the scope of the present invention.

Figure 2:
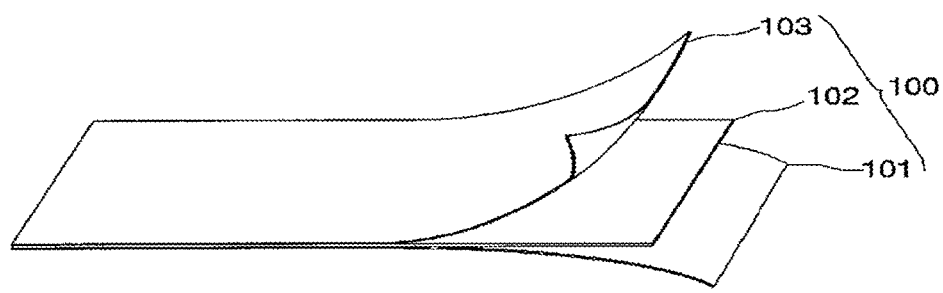
FIG. 2 illustrates a barrier sheet used in a barrier structure of an LNG cargo tank in accordance with an embodiment of the present invention.

FIG. 2 illustrates a barrier sheet used in a barrier structure of an LNG cargo tank in accordance with an embodiment of the present invention.

Referring to FIG. 2, a barrier sheet 100 of the LNG cargo tank in accordance with an embodiment of the present invention may have a sandwich structure or stacked structure of thin layers to form a secondary barrier of the LNG cargo tank. That is, the barrier sheet 100 in accordance with the embodiment may include a first metal layer 101, a glass cloth layer 102, and a second metal layer 103, which correspond to the stacked thin layers.

The barrier sheet 100 may have a thin plate shape such as a belt or strip shape to be coupled to another sheet for the secondary barrier of the LNG cargo tank.

The first and second metal layers 101 and 103 of the barrier sheet 100 may be formed of aluminum or stainless steel. The first and second metal layers 101 and 103 may have a thickness of about 0.03 to 0.2 mm when they are formed of aluminum.

In exemplary embodiment, when the thickness of the first and second layers 101 and 103 is smaller than 0.03 mm, it is highly likely that pin holes are formed while the first and second layers 101 and 103 are manufactured and handled. Meanwhile, when the thickness of the first and second layers 101 and 103 is larger than 0.2 mm, the flexibility of the barrier sheet 100 rapidly decreases. When the secondary barrier is constructed, it may become difficult to deal with a level difference between top and lower insulation panels 20 and 21.

Further, the first and second metal layers 101 and 103 may have a thickness of about 0.05 to 0.1 mm when being formed of stainless steel. In this regard, the numerical values for the thickness may include values optimized by considering the manufacturing process, the handling process, and the level difference, in correspondence to stainless steel.

Therefore, when the manufacturing process, the handling process, and the level difference are considered, it is understood that the numerical values for the thickness of the first and second metal layers 101 and 103 may correspond to critical values at which the first and second metal layers 101 and 103 may exhibit a superior mechanical property to the existing triplex (for example, the conventional sample) which will be described below with reference to Table 1 and exhibit an excellent sealing characteristic which will be described with reference to FIG. 4.

Meanwhile, the glass cloth layer 102 may be interposed between the first and second metal layers 101 and 103 via an adhesive. The glass cloth layer 102 may be formed of prepreg which is fiber reinforced composite materials. Further, the glass cloth layer 102 may have an optimized thickness of about 0.15 to 0.4 mm such that the barrier sheet 100 in accordance with the embodiment satisfies a superior mechanical property and an excellent sealing characteristic when the secondary barrier is constructed.

Figure 3:
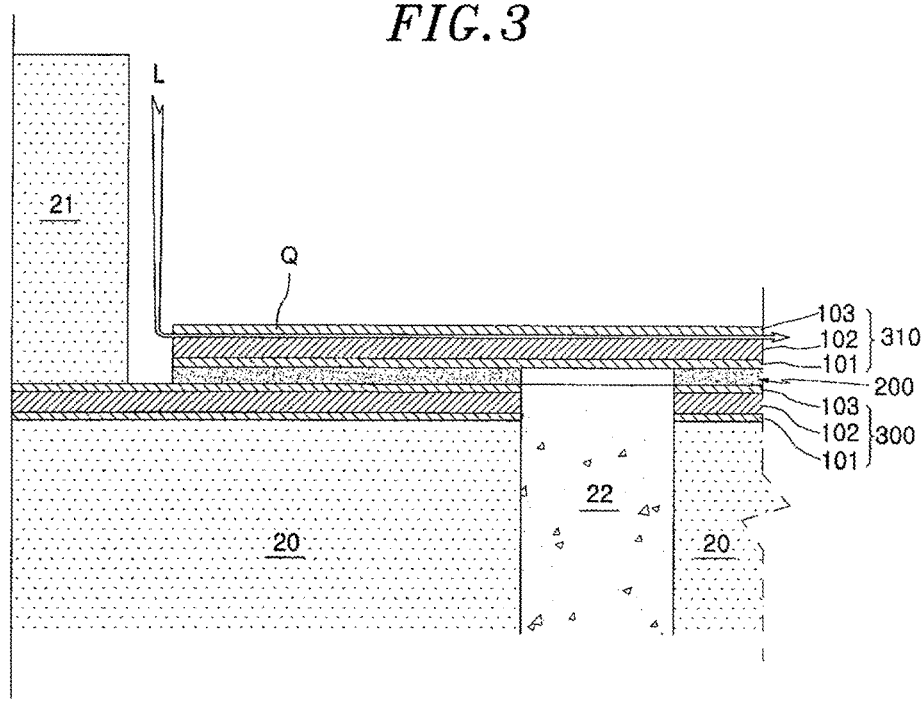
FIG. 3 is a cross-sectional view of a barrier structure of the LNG cargo tank employing the barrier sheet shown in FIG. 2.

FIG. 3 is a cross-sectional view of a barrier structure forming the secondary barrier of the LNG cargo tank using the barrier sheet illustrated in FIG. 2.

Referring to FIG. 3, the barrier structure in accordance with the embodiment of the present invention includes insulation panels 20 and 21, a first barrier sheet 300, and a second barrier sheet 310. The insulation panels 20 and 21 include lower insulation panels 20 adjacent to each other with a flat joint 22 interposed therebetween and an upper insulation panel 21 stacked over the lower insulation panel 20. The first barrier sheet 300 is attached between the upper and lower insulation panels 21 and 20 so as to form the secondary barrier of the LNG cargo tank. The second barrier sheet 310 is attached on the first barrier sheet over the flat joint 22.

The first barrier sheet 300 in accordance with the embodiment is strictly managed after the first barrier sheet 300 has been previously attached or coupled to the surface of the lower insulation panel 20 so as to have a rigid characteristic, during the manufacturing process. Then, the first barrier sheet 300 is managed without a flexural deformation even while it is shipped to the field. Therefore, the above-described leakage path is rarely formed.

Further, the second barrier sheet 310 having a supple characteristic is manufactured in such a shape as to be rolled and then unrolled for use. Therefore, the second barrier sheet 310 may be bonded and attached to the first barrier sheet 300 so as to form the secondary barrier of the LNG cargo tank.

Each of the first and second barrier sheets 300 and 310 may include the first metal layer 101, the glass cloth layer 102, and the second metal layer 103, as described above with reference to FIG. 2.

As the thicknesses of the first and second metal layers 101 and 103 in the first and second barrier sheets 300 and 310 are properly selected, the first and second barrier sheets 300 and 310 may have rigid and supple characteristics. In other words, the thicknesses of the first and second metal layers 101 and 103 in the barrier sheet 300 may be set to a large value within the above-described thickness range, and the thicknesses of the first and second metal layers 101 and 103 in the second barrier sheet 310 may be set to a smaller value than the first barrier sheet 300 within the above-described thickness range, which may result in that the first and second barrier sheets 300 and 310 have rigid and supple characteristics, respectively.

Furthermore, when the second barrier sheet 310 is bonded over the first barrier sheet 300 or ends of the barrier sheets are connected and bonded to each other, the barrier sheets may be bonded to each other through an adhesive layer 200. The adhesive layer 200 may be formed by applying a commercial liquid adhesive for the secondary barrier onto the first metal layer 101 in the second barrier sheet 310 or the second metal layer 103 in the first barrier sheet 300 and then heating and pressurizing the applied liquid adhesive using a surface heater such as a ceramic heater (not illustrated).

Alternatively, the adhesive layer 200 may be formed by bonding an adhesive film in which a synthetic resin film has an adhesive applied the surface thereof, to the first metal layer 101 in the second barrier sheet 310 or the second metal layer 103 in the first barrier sheet 300.

According to the above-described barrier structure, when the first and second barrier sheet 300 and 310 are used to construct the secondary barrier of the LNG cargo tank, the second metal layer 103 of the first barrier sheet 300 and the first metal layer 101 of the second barrier sheet 310 are bonded to each other through the adhesive layer 200. When an interlayer adhesion defect occurs in the first and second barrier sheets 300 and 310 each including the glass cloth layer 102 coupled between the first and second metal layers 101 and 103 due to a manufacturing error, a movable gap Q may be formed between the first metal layer 101 and the glass cloth layer 102 or the second metal layer 103 and the glass cloth layer 102.

However, although the gap Q or crack is formed in the first and second barrier sheets 300 and 310 constructed in the field due to repeated thermal stresses, gas and/or liquid L stored in the internal space of the cargo tank does not leak.

That is because, although the gas and/or liquid L stored in the internal space of the cargo tank may flow between the first metal layer 101 and the glass cloth layer 102 or the second metal layer 103 and the glass cloth layer 102 along the gap Q, the first metal layer 101 in the second barrier sheet 310 and the second metal layer 103 in the first barrier sheet 300 are bonded to each other through the adhesive layer 200.

Under the supposition that there are no problems in forming the adhesive layer 200, liquid tightness and/or air tightness may be maintained by the second and first metal layers 103 and 101 in the first and second barrier sheet 300 and 310 and the adhesive layer 200. Accordingly, gas and/or liquid L does not leak toward the pores of the flat joint 22 or an external space of the cargo tank through the pores of the flat joint 22.

The mechanical properties and sealing characteristics of the first and second barrier sheets 300 and 310 having the above-described thicknesses were tested as follows. This test was performed on a sample corresponding to the first and second barrier sheets in accordance with the embodiment and a sample corresponding to the triplex for the secondary barrier of the conventional cargo tank, under test conditions of about 25° C. of a room temperature and about −170° C. of an ultra-low temperature, based on a test standard of ASTM D3039 (test speed: 2.0 mm/min).

The test result was measured by the universal testing machine (UTM) of ISNTRON Corporation.

Table 1 shows the test results of the sample in accordance with the embodiment of the present invention and the triplex for the secondary barrier of the conventional cargo tank. Referring to Table 1, it can be seen that the sample in accordance with the embodiment of the present invention has a much higher tensile strength and a much higher strength corresponding to an elasticity coefficient than the triplex for the secondary barrier of the conventional cargo tank, in both of room temperature and ultra-low temperature environments.

TABLE 1

| Characteristic Unit | | Tensile strength | | Elastic coefficient | |
|---|---|---|---|---|---|
| | | Warp direction | Weft direction | Warp direction | Weft direction |
| | | Mpa | | Mpa | |
| Room temperature | Prior art | 211.3 | 168.4 | 10100 | 8771 |
| | Present invention | 302.5 | | 25879 | |
| Ultra-low temperature | Prior art | 389.2 | 335.5 | 11371 | 7229 |
| | Present invention | 461.3 | | 29948 | |

Figure 4:
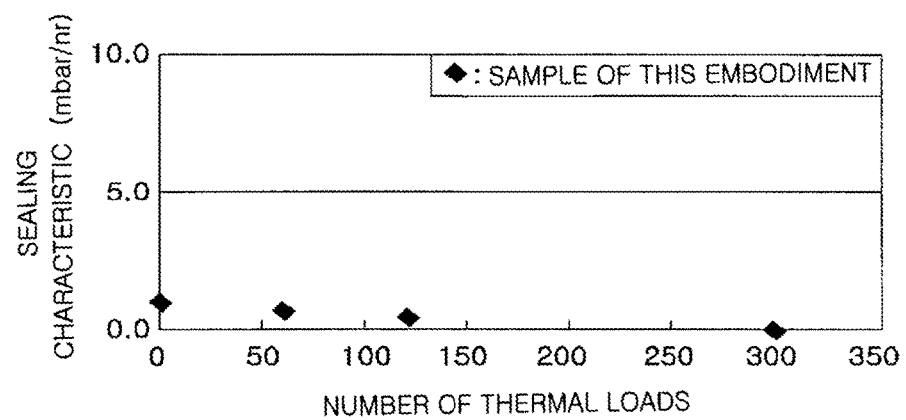
FIG. 4 is a graph showing a sealing characteristic of the barrier sheet shown in FIG. 2.

FIG. 4 is a graph showing the sealing characteristic of the first and second barrier sheets in accordance with the embodiment of the present invention.

Referring to FIG. 4, it can be seen that the sealing characteristic of the sample in accordance with the embodiment hardly change even though repeated thermal loads, for example, 60, 120, or 300 times of thermal loads are repeated, which means that the sample has excellent air tightness and liquid tightness characteristics.

While the invention has been shown and described with respect to the preferred embodiments, it will be understood by those skilled in the art that various changes and modifications may be made without departing from the scope of the invention as defined in the following claims.

The invention claimed is:

1. A barrier structure for a liquefied natural gas cargo tank, the barrier structure comprising:
    an insulation panel fixed to the cargo tank and comprising lower insulation panels adjacent to each other with a flat joint interposed therebetween and an upper insulation panel stacked over the lower insulation panels;
    a first barrier sheet attached between the upper insulation panel and the lower insulation panels,
    a second barrier sheet attached on the first barrier sheet over the flat joint, and
    an adhesive layer disposed between the first barrier sheet and the second barrier sheet and bonding the first barrier sheet to the second barrier sheet,
    wherein each of the first barrier sheet and the second barrier sheet comprises a first metal layer, a second metal layer, and a glass cloth layer interposed between the first metal layer and the second metal layer,
    wherein a lower surface of the first metal layer of the second barrier sheet directly contacts the adhesive layer,
    wherein the first metal layer of the first barrier sheet directly contacts the lower insulation panels,
    wherein a portion of an upper surface of the second metal layer of the first barrier sheet directly contacts the upper insulation panel and another portion of the upper surface of the upper surface of the second metal layer of the first barrier sheet directly contacts the adhesive layer, and
    wherein a lower surface of the second metal layer of the first barrier sheet directly contacts the glass cloth layer of the first barrier sheet.

2. The barrier structure of claim 1, wherein the first and second metal layers are formed of aluminum, and have a thickness of about 0.03 to 0.2 mm.

3. The barrier structure of claim 1, wherein the first and second metal layers are formed of stainless steel, and have a thickness of about 0.05 to 0.1 mm.

4. The barrier structure of claim 1, wherein the adhesive layer is configured as a liquid adhesive for the secondary barrier or a synthetic resin film having an adhesive applied thereon.

5. The barrier structure of claim 1, wherein the glass cloth layer is formed of prepreg which is fabric reinforced composite materials.

6. The barrier structure of claim 1, wherein the glass cloth layer has a thickness of about 0.15 to 0.4 mm such that the first and second barrier sheets satisfy a mechanical property for the secondary barrier.

* * * * *